United States Patent

Wang

[11] Patent Number: 5,921,101
[45] Date of Patent: Jul. 13, 1999

[54] COOLING LIQUID DISTRIBUTING METHOD AND SYSTEM

[76] Inventor: Huai-Wei Wang, No. 10, Lane 145, Chung-Mei Rd., Sec.2, Chungli, City, Taoyuae Hsien, Taiwan

[21] Appl. No.: 09/096,240

[22] Filed: Jun. 11, 1998

[51] Int. Cl.⁶ ............................... F28D 5/00; F25B 47/00
[52] U.S. Cl. ............................................. 62/305; 62/280
[58] Field of Search ............................... 62/272, 279, 280, 62/305

[56] References Cited

U.S. PATENT DOCUMENTS

| | | | |
|---|---|---|---|
| 1,730,866 | 10/1929 | Sternberg | 62/280 |
| 1,914,812 | 6/1933 | Kresser | 62/280 |
| 2,485,733 | 10/1949 | Hart | 62/280 |
| 2,617,637 | 11/1952 | Moore | 62/280 |
| 2,934,914 | 5/1960 | Bohman et al. | 62/280 |
| 5,337,580 | 8/1994 | Zhao et al. | 62/262 |

*Primary Examiner*—William Doerrler
*Attorney, Agent, or Firm*—Dougherty & Troxell

[57] ABSTRACT

A method and system to distribute evaporative cooling liquid onto a heat-exchanger in an air conditioner which uses a rotating air blower to generate a forced air flow toward the heat-exchanger. The liquid distributing system consists of a liquid dispenser fixedly mounted on the rotating axis of the air blower, a liquid supplier to provide the cooling liquid to the liquid dispenser. As the blades of the air blower are turned to provide a forced airflow, the liquid dispenser rotates along with the rotating axis of the air blower. The centrifugal force resulting from the rotating motion of the liquid dispenser causes the liquid received by the dispenser to scatter toward the heat exchanger.

4 Claims, 2 Drawing Sheets

COOLING LIQUID DISTRIBUTING METHOD AND SYSTEM

BACKGROUND OF THE INVENTION

The present invention is related to a liquid distributing method and system for dispensing an evaporative cooling liquid onto a condenser in an air conditioner. In particular, the present invention is related to a means for spraying an evaporative cooling liquid onto a heat-exchanger.

Forcing an airflow while spraying a large amount of droplets of evaporative cooling liquid onto a heat-exchanger in a condenser can substantially reduce the temperature of the heat-exchanger. This temperature reduction enhances the subcooling condition of the refrigerant and, therefore, reduces the load of the compressor and increases the efficiency of an air conditioner

SUMMARY OF THE INVENTION

It is the main objective of the present invention to provide a simple and effective distributing method and system for spraying an evaporative cooling liquid on the heat-exchanger.

The liquid distributing system, according to the present invention, consists of a liquid container, a liquid pump, a pipe, a liquid dispenser and a liquid level controller. The liquid distributing system can be used in any air conditioner wherein a rotating air blower is used to create a forced air flow toward a heat-exchanger. The liquid container is used to hold a sufficient amount of evaporative cooling liquid. The cooling liquid is transferred by the pump through a pipe to the liquid dispenser. The liquid dispenser is fixedly mounted on the axis of the air blower.

As the blades of the air blower are turned to provide a forced air flow, the liquid dispenser rotates along with the rotating axis of the air blower. The centrifugal force resulting from the rotating motion of the liquid dispenser causes the liquid received by the dispenser to scatter toward a heat exchanger.

The advantages of the distributing system, according to the present invention, include the following:

1. The system makes use of the rotation motion of the air blower to scatter the cooling liquid and, therefore, an additional electromechanical device for dispensing the liquid is unnecessary.
2. The power requirement of the pump is minimal. With the distributing system, it is not necessary to dispense the cooling liquid with a high pressure pumping device. Instead, the cooling liquid is only required to be carried to the liquid dispenser.
3. The noise associated with the spraying process is low.
4. The distribution of evaporative cooling liquid on the heat exchanger is uniform and consistent.

The unique feature of the liquid distributing method, according to the present invention, is the mounting of the liquid dispenser on the rotating axis, taking advantage of the existing rotating motion of the air blower axis. As the liquid dispenser rotates along with the axis of the air blower, the cooling liquid received by the dispenser is scattered by the rotating motion of the liquid dispenser and further carried forward by the air flow.

The liquid distributing method and system of the present invention will become apparent upon reading the description of the drawing figures.

DETAILED DESCRIPTION OF THE INVENTION

Figure 1:
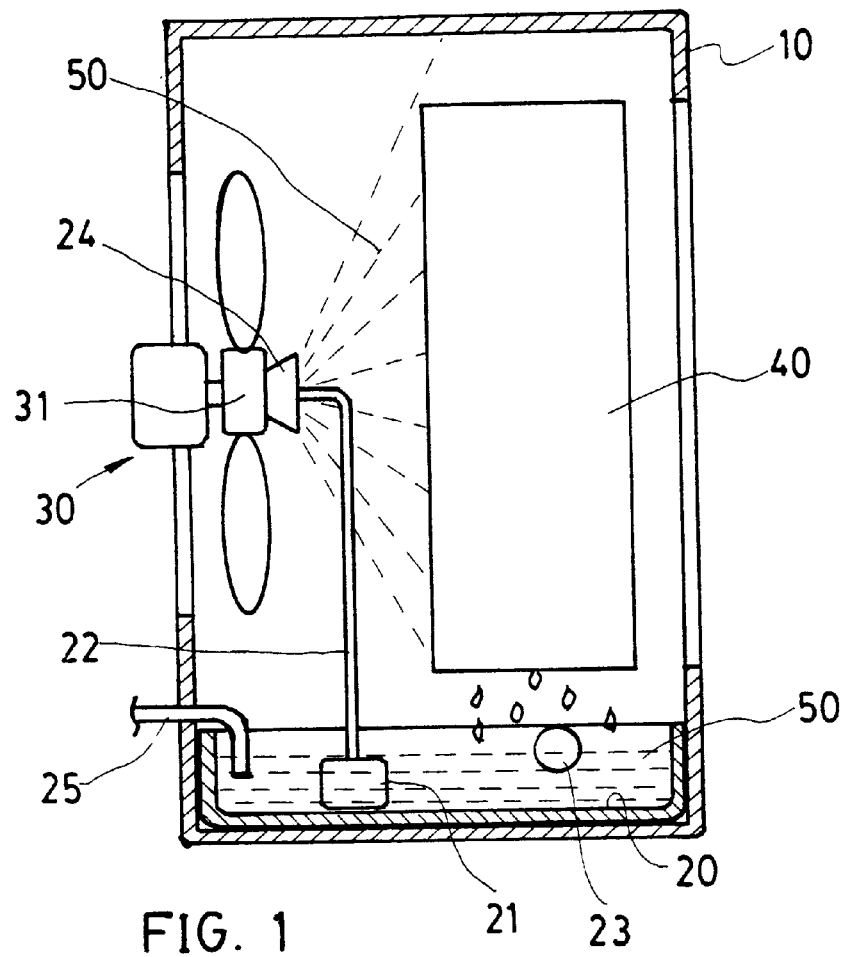
FIG. 1 illustrates a schematic diagram of the evaporative cooling liquid distributing system, according to the present invention.

FIG. 1 illustrates the schematic diagram of the evaporative cooling liquid distributing system, according to the present invention. As shown in FIG. 1, numeral 10 denotes a casing which is used to house a heat-exchanger 40, a liquid container 20 for holding a sufficient amount of evaporative cooling liquid 50 which is supplied through an external pipe 25, a liquid pump 21 for carrying the liquid through a pipe 22 to a liquid dispenser 24 which is fixedly mounted on the axis 31 and in front of an air blower 30. Water, any proper liquid coolant or a combination of coolants can be used as the cooling liquid 50.

As the air blower 30 is turned on to provide a forced air flow, the liquid dispenser rotates along with the rotating axis 31 of the air blower. By the action of centrifugal force resulting from the rotating motion of the liquid dispenser, the liquid in the dispenser is scattered around the dispenser. Due to the cup shape of the liquid dispenser and the air flow, the scattered liquid droplets are uniformly sprayed onto the heat-exchanger 40. The air flow through the heat-exchanger contributes significantly to the evaporation process of the cooling liquid dispersed on the heat exchanger.

Preferably, a liquid level controller 23, which controls the flow of the evaporative cooling liquid through the external pipe 25, is used to maintain the level of the cooling liquid in the liquid container 20.

Figure 2:
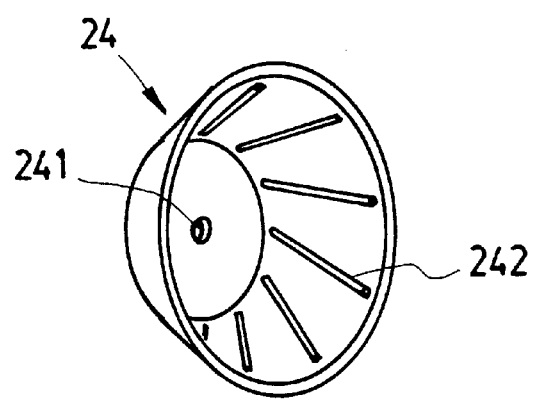
FIG. 2 is a perspective view of the liquid dispenser, according to the present invention.

FIG. 2 is a perspective view of the liquid dispenser, according to the present invention. As shown, the liquid dispenser 24 is shaped like a cup, with the diameter of the cup rim is much larger than the diameter of the bottom. In the center of the bottom of the dispenser, there is a mounting hole 241. Inside the cup, there is a plurality of ridges 242 to help dispensing the cooling liquid in the dispenser.

Figure 3:
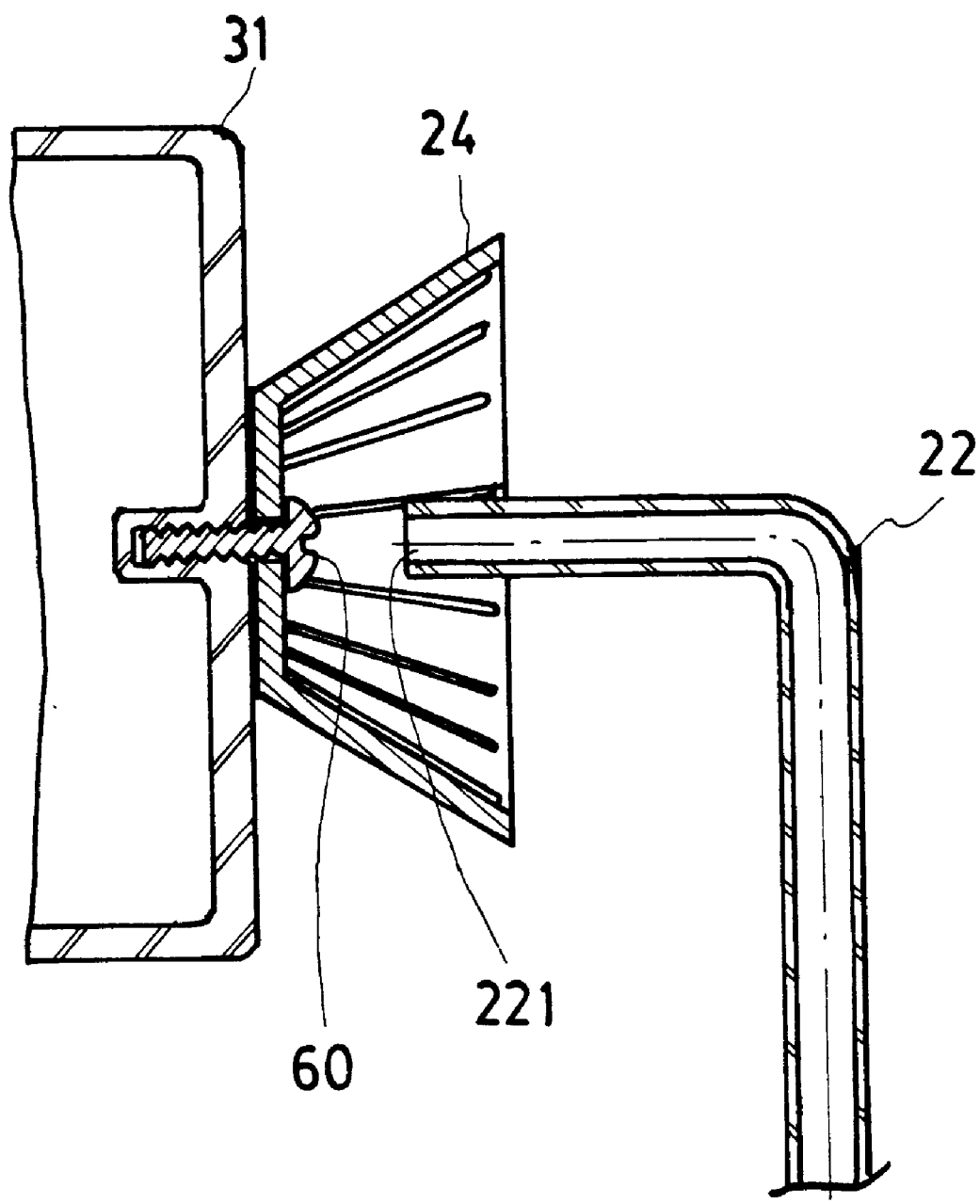
FIG. 3 is a cross-sectional view of the dispenser which is fixedly mounted on the axis of an air blower and the pipe used to feed the evaporative cooling liquid to the dispenser.

FIG. 3 is a cross-sectional view of the liquid dispenser and the feeding pipe. As shown, a bolt 60 is used to fixedly mount the liquid dispenser 24 to the rotating axis 31 of an air blower 30.

The output end 221 of the pipe 22 is located in front of the dispenser 24. While the pump 21 carries the cooling liquid 50, as shown in FIG. 1, through the pipe 22 to the liquid dispenser 24, the liquid dispenser rotates along with the rotating axis of the air blower. The cooling liquid in the dispenser is caused to move outward by the centrifugal force generated by the rotating motion of the dispenser 24. At the same time, the liquid in the dispenser is separated and guided by the ridges on the inside surface of the liquid dispenser. As a result, the liquid carried into the liquid dispenser forms a large number of fine streams of droplets, to be hurled toward the heat-exchanger.

As the droplets of the cooling liquid are dispersed over the heat-exchanger, part of the liquid dissipates through the process of evaporation, part of it drips down to the liquid container. The evaporative cooling liquid, as depicted in FIG. 1, is transferred from a liquid container by a pump installed within the condenser casing. It should be noted, however, that the liquid container and the pump can be installed outside the casing.

The evaporative cooling liquid distributing method takes advantage of the existing rotating motion of an air blower to dispense the cooling liquid onto a heat-exchanger. Thus, an additional power source for dispensing the liquid, such as a high-pressure pump, becomes unnecessary.

While the present invention has been disclosed in reference to the preferred embodiment, it shall be understood by those skilled in the art that various changes, modifications and substitutions may be incorporated into such embodiments without departing from the spirit of the invention as defined by the claims appearing hereafter.

What is claimed is:

1. An evaporative cooling system for an air conditioner having an air blower for rotating about an axis so as to provide air flow toward a heat exchanger, the fan having a hub, the system comprising:

a) a liquid dispenser rotated about the fan rotating axis by the fan, the liquid dispenser having a truncated conical configuration with a bottom wall and a conically configurated side wall extending therefrom to bound an interior of the liquid dispenser;

b) a plurality of ridges extending from an inner surface of the side wall into the interior of the liquid dispenser;

c) a liquid container holding evaporative cooling liquid;

d) an evaporative cooling liquid pipe having an outlet located within the interior of the liquid dispenser; and, e) a liquid pump connected to the evaporative cooling liquid pipe so as to pump evaporative cooling liquid from the liquid container through the evaporative cooling liquid pipe whereby evaporative cooling liquid passes out through the pipe outlet into contact with the liquid dispenser and is distributed onto the heat exchanger by rotation of the liquid dispenser.

2. The evaporative cooling system of claim 1 wherein the plurality of ridges of the liquid dispenser are elongated ridges.

3. The evaporative cooling system of claim 1 further comprising an evaporative cooling liquid supply pipe to supply evaporative cooling liquid to the liquid container.

4. The evaporative cooling system of claim 3 further comprising a liquid level controller to maintain evaporative cooling liquid in the liquid container at a predetermined level.

* * * * *